(12) United States Patent
Feng et al.

(10) Patent No.: US 11,108,541 B1
(45) Date of Patent: Aug. 31, 2021

(54) METHODS AND APPARATUSES FOR EXECUTING SMART CONTRACT OF BLOCKCHAIN, AND ELECTRONIC DEVICES

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/244,719

(22) Filed: Apr. 29, 2021

Related U.S. Application Data

(63) Continuation of application No. PCT/CN2019/120639, filed on Nov. 25, 2019.

(30) Foreign Application Priority Data

Jan. 31, 2019 (CN) .......................... 201910095127.9

(51) Int. Cl.
*H04L 9/06* (2006.01)
*G06F 16/27* (2019.01)

(52) U.S. Cl.
CPC ............ *H04L 9/0618* (2013.01); *G06F 16/27* (2019.01); *H04L 2209/38* (2013.01)

(58) Field of Classification Search
CPC combination set(s) only.
See application file for complete search history.

(56) References Cited

U.S. PATENT DOCUMENTS

2013/0326008 A1  12/2013  Morgan et al.
2018/0326291 A1  11/2018  Tran et al.
(Continued)

FOREIGN PATENT DOCUMENTS

CN  107103054  8/2017
CN  107423945  12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Arvin Eskandarnia
(74) *Attorney, Agent, or Firm* — Fish & Richardson P.C.

(57) ABSTRACT

A blockchain-based smart contract execution computer-implemented method, medium, and system are disclosed. In one computer-implemented method, a target transaction initiated by a client device is received by a node device in a blockchain to invoke a target smart contract. The blockchain is interconnected to a trusted third party. A contract engine for smart contract execution is deployed in the trusted third party. Contract source code of the target smart contract is obtained from a distributed database of the blockchain by the node device in response to the target transaction being received by the node device. The contract source code is sent by the node device to the trusted third party. An execution result from execution of the contract source code by the contract engine is received from the trusted third party by the node device.

20 Claims, 4 Drawing Sheets

(56) References Cited

U.S. PATENT DOCUMENTS

2020/0084097 A1\* 3/2020 Marks .............. G06Q 20/38215
2020/0242595 A1\* 7/2020 Harrison ................. H04L 63/12

FOREIGN PATENT DOCUMENTS

| CN | 107464118 | 12/2017 |
| CN | 107526624 | 12/2017 |
| CN | 108830606 | 11/2018 |
| CN | 108833161 | 11/2018 |
| CN | 109146679 | 1/2019 |
| CN | 109189396 | 1/2019 |
| CN | 110060155 | 7/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/120639, dated Feb. 27, 2020, 10 pages (with partial English translation).

\* cited by examiner

METHODS AND APPARATUSES FOR EXECUTING SMART CONTRACT OF BLOCKCHAIN, AND ELECTRONIC DEVICES

CROSS-REFERENCE TO RELATED APPLICATIONS

This application is a continuation of PCT Application No. PCT/CN2019/120639, filed on Nov. 25, 2019, which claims priority to Chinese Patent Application No. 201910095127.9, filed on Jan. 31, 2019, and each application is hereby incorporated by reference in its entirety.

TECHNICAL FIELD

Embodiments of the present specification relate to the field of blockchain technologies, and in particular, to methods and apparatuses for executing a smart contract of a blockchain, and electronic devices.

BACKGROUND

The blockchain technology is also referred to as a distributed ledger technology, and is an emerging technology in which several computing devices jointly participate in "accounting" and jointly maintain a complete distributed database. The blockchain technology has been widely applied in many fields because the blockchain technology features in decentralization, openness, and transparency, and each computing device can participate in database recording and quickly perform data synchronization.

SUMMARY

Embodiments of the present specification provide methods and apparatuses for executing a smart contract of a blockchain, and electronic devices.

According to a first aspect of the embodiments of the present specification, a method for executing a smart contract of a blockchain is provided, where the blockchain is interconnected to a trusted third party, a contract engine for executing a smart contract is deployed in the trusted third party, and the method includes the following: a node device in the blockchain receives a target transaction initiated by a client device to invoke a target smart contract; obtains contract source code of the target smart contract from a distributed database of the blockchain in response to the target transaction; and sends the contract source code to the trusted third party so that the contract engine of the trusted third party executes the contract source code and returns an execution result to the node device.

Optionally, the target transaction includes a target smart contract name and a name of a target function invoked in the target smart contract; and the obtaining contract source code of the target smart contract from a distributed database of the blockchain specifically includes: obtaining contract source code corresponding to the target smart contract name from the distributed database of the blockchain based on the target smart contract name included in the target transaction; and obtaining contract source code corresponding to the name of the target function from the obtained contract source code based on the name of the target function invoked in the target smart contract.

Optionally, the transaction includes an input parameter; and the sending the contract source code to the trusted third party so that the contract engine of the trusted third party executes the contract source code includes: sending the contract source code and the input parameter to the trusted third party, so that the trusted third party obtains input data corresponding to the input parameter from the node device, loads the input data into the contract source code, and executes the contract source code.

Optionally, the blockchain is interconnected to another trusted third party that serves as a verification party; and the method further includes: sending the execution result to the other trusted third party, so that a contract engine of the other trusted third party verifies the execution result; and in response to determining that the verification on the execution result succeeds, publishing the execution result to all node devices in the blockchain for consensus processing, and storing the execution result in the blockchain after the consensus succeeds.

Optionally, the execution result is a result set generated by the trusted third party based on an execution result of the contract source code, and the result set includes a read-write set generated in a process of executing the contract source code and an execution result obtained after the contract source code is executed; and a verification process for the execution result includes the following: the contract engine of the other trusted third party reads input data from the read-write set, loads the read input data into the contract source code, and simulates execution of the contract source code; determines whether an execution result generated by simulating execution of the contract source code is consistent with the execution result in the result set; and in response to determining that the execution result generated by simulating execution of the contract source code is consistent with the execution result in the result set, determines that the verification on the execution result succeeds.

Optionally, the execution result is a result set generated by the trusted third party based on an execution result of the contract source code, and the result set includes a read-write set generated in a process of executing the contract source code and an execution result obtained after the contract source code is executed; and a verification process for the execution result includes the following: the contract engine of the other trusted third party reads input data from the read-write set, loads the read input data into the contract source code, and simulates execution of the contract source code; determines whether a read-write set generated by simulating execution of the contract source code is consistent with the read-write set in the result set; and in response to determining that the read-write set generated by simulating execution of the contract source code is consistent with the read-write set in the result set, determines that the verification on the execution result succeeds.

Optionally, the blockchain is a consortium blockchain.

According to a second aspect of the embodiments of the present specification, a method for executing a smart contract of a blockchain is provided, where the blockchain is interconnected to a trusted third party, a contract engine for executing a smart contract is deployed in the trusted third party, and the method includes the following: the contract engine of the trusted third party receives contract source code sent by a node device in the blockchain, where the node device is a node that responds to a target transaction request initiated by a client device to invoke a target smart contract in the blockchain, and the contract source code is contract source code of the target smart contract; and executes the contract source code and returns an execution result to the node device.

Optionally, the transaction includes an input parameter; the receiving contract source code sent by a node device in the blockchain specifically includes: receiving the contract source code and the input parameter that are sent by the node device in the blockchain; and the executing the contract source code specifically includes: obtaining input data corresponding to the input parameter from the node device, loading the input data into the contract source code, and executing the contract source code.

Optionally, the method further includes: when receiving a verification request sent by the node device for a result set of a contract engine of another trusted third party, verifying the result set, where the result set includes a read-write set generated in a process of executing the contract source code and an execution result obtained after the contract source code is executed; and in response to determining that the verification on the result set succeeds, publishing the execution result in the result set to all node devices in the blockchain for consensus processing, and storing the execution result in the result set in the blockchain after the consensus succeeds.

Optionally, a verification process for the second execution result includes: reading input data from the read-write set, loading the read input data into the contract source code, and simulating execution of the contract source code; determining whether an execution result generated by simulating execution of the contract source code is consistent with the execution result in the result set; and in response to determining that the execution result generated by simulating execution of the contract source code is consistent with the execution result in the result set, determining that the verification on the execution result succeeds.

Optionally, a verification process for the second execution result includes: reading input data from the read-write set, loading the read input data into the contract source code, and simulating execution of the contract source code; determining whether a read-write set generated by simulating execution of the contract source code is consistent with the read-write set in the result set; and in response to determining that the read-write set generated by simulating execution of the contract source code is consistent with the read-write set in the result set, determining that the verification on the execution result succeeds.

Optionally, the blockchain is a consortium blockchain.

According to a third aspect of the embodiments of the present specification, an apparatus for executing a smart contract of a blockchain is provided, where the blockchain is interconnected to a trusted third party, a contract engine for executing a smart contract is deployed in the trusted third party, and the apparatus includes: a receiving unit, configured to receive a target transaction initiated by a client device to invoke a target smart contract; a response unit, configured to obtain contract source code of the target smart contract from a distributed database of the blockchain in response to the target transaction; and an execution unit, configured to send the contract source code to the trusted third party so that the contract engine of the trusted third party executes the contract source code and returns an execution result to the node device.

According to a fourth aspect of the embodiments of the present specification, an apparatus for executing a smart contract of a blockchain is provided, where the blockchain is interconnected to a trusted third party, a contract engine for executing a smart contract is deployed in the trusted third party, and the method includes: a receiving unit, configured to receive contract source code sent by a node device in the blockchain, where the node device is a node that responds to a target transaction request initiated by a client device to invoke a target smart contract in the blockchain, and the contract source code is contract source code of the target smart contract; and an execution unit, configured to execute the contract source code and return an execution result to the node device.

According to a fifth aspect of the embodiments of the present specification, an electronic device is provided, including: a processor; and a memory configured to store processor-executable instructions, where the processor is configured to perform any one of the previously described methods for executing a smart contract of a blockchain.

The embodiments of the present specification provide solutions for executing a smart contract of a blockchain, to decouple the smart contract from a node in the blockchain. The node device in the blockchain no longer stores the smart contract and is not responsible for running the smart contract. Instead, a contract engine deployed in a trusted third party interconnected to the blockchain is responsible for running the smart contract. As such, when a node device that responds to a transaction initiated by a client device in the blockchain needs to execute related service logic, the node device can invoke the contract engine of the trusted third party, so that the contract engine runs a related smart contract to obtain an execution result. The smart contract is unbound from the node device to separate the smart contract from the node device, to be run by the contract engine, which simplifies a function of the node device, thereby reducing a demand for performance of the node device (for example, a device with low performance can also be used as a node device to access the blockchain). In addition, when consensus is performed among node devices in the blockchain, the consensus can be implemented only by comparing a result set with a world state instead of depending on a smart contract, so that not every device needs to participate in smart contract execution, thereby greatly improving consensus efficiency. Furthermore, as a node dedicated to running a smart contract, the trusted third party interconnected to the blockchain can be provided with powerful storage and computational capacities in advance to deploy a large quantity of smart contracts, and service logic of the smart contract can be designed to be relatively complex to cope with a service need with a relatively large computational load and relatively high service complexity.

DETAILED DESCRIPTION

Example embodiments are described in detail here, and examples of the example embodiments are presented in the accompanying drawings. When the following description relates to the accompanying drawings, unless specified otherwise, same numbers in different accompanying drawings represent the same element or similar elements. Implementations described in the following example embodiments do not represent all implementations consistent with the present specification. On the contrary, they are only examples of apparatuses and methods that are described in the appended claims in detail and that are consistent with some aspects of the present specification.

The terms used in the present specification are merely used for the purpose of describing specific embodiments, and are not intended to limit the present specification. The singular forms "a", "the", and "this" used in the present specification and the appended claims are also intended to include plural forms, unless otherwise specified in the context clearly. It is worthwhile to further understand that, the term "and/or" used in the present specification indicates inclusion of any or all possible combinations of one or more associated listed items.

It is worthwhile to understand that although terms such as "first", "second", and "third" may be used in the present specification to describe various types of information, these types of information are not limited by these terms. These terms are only used to distinguish between information of the same type. For example, without departing from the scope of the present specification, "first information" can also be referred to as "second information", and similarly, "second information" can also be referred to as "first information". Depending on the context, for example, the word "if" used here can be explained as "while", "when", or "in response to determining".

A smart contract is a computer protocol that can be deployed in a blockchain to spread, verify, or execute a contract in an informatized way. A corresponding operation can be performed by declaring service logic in the smart contract. The smart contract allows a trusted transaction to be performed without a third party. The transaction is traceable and irreversible. The smart contract can provide better security than conventional contract methods and reduce other contract-related transaction costs.

First, a conventional method for deploying a smart contract in a blockchain is described. A conventional smart contract is directly deployed in a node device in the blockchain, and a node device directly runs a corresponding locally-deployed smart contract when executing a transaction request. When consensus is required, an execution result is also published for consensus performed by all node devices in the blockchain, and each node device needs to run a locally-deployed smart contract for consensus. It can be seen that, the conventional smart contract is tightly coupled to the node device, and each node device needs to deploy a smart contract and needs to run the smart contract, which undoubtedly adds a lot of burden to the node device (the node device needs to have a specific computing capability). In addition, when consensus is performed among the node devices, each node device needs to execute the smart contract again to determine whether the execution result is correct, resulting in low consensus efficiency. Furthermore, because the node device has limited storage and computational capacities, a smart contract quantity and complexity are correspondingly limited, and the conventional smart contract cannot be used to execute service logic with a relatively large computational load and relatively high complexity.

The present specification provides solutions for executing a smart contract of a blockchain, to improve performance and efficiency of node devices in the blockchain, efficiency of performing consensus among the node devices, efficiency of executing the smart contract, etc. by optimizing the conventional smart contract, thereby improving overall performance of the blockchain.

In the implementations of the present specification, a smart contract is decoupled from a node in a blockchain. The node device in the blockchain no longer stores the smart contract and is not responsible for running the smart contract. Instead, a contract engine deployed in a trusted third party interconnected to the blockchain is responsible for running the smart contract. As such, when a node device that responds to a transaction initiated by a client device in the blockchain needs to execute related service logic, the node device can invoke the contract engine of the trusted third party, so that the contract engine runs a related smart contract to obtain an execution result. The smart contract is unbound from the node device to separate the smart contract from the node device, to be run by the contract engine, which simplifies a function of the node device, thereby reducing a demand for performance of the node device (for example, a device with low performance can also be used as a node device to access the blockchain). In addition, when consensus is performed among node devices in the blockchain, the consensus can be implemented only by comparing a result set with a world state instead of depending on a smart contract, so that not every device needs to participate in smart contract execution, thereby greatly improving consensus efficiency. Furthermore, as a node dedicated to running a smart contract, the trusted third party interconnected to the blockchain can be provided with powerful storage and computational capacities in advance to deploy a large quantity of smart contracts, and service logic of the smart contract can be designed to be relatively complex to cope with a service need with a relatively large computational load and relatively high service complexity.

The blockchain described in the present specification can specifically include a private blockchain, a public blockchain, a consortium blockchain, etc., and is not specifically limited in the present specification.

For example, in a scenario, the blockchain can be specifically a consortium blockchain that includes headquarters, branches, agents, node devices, etc. serving as consortium members, an operator of the consortium blockchain can deploy a corresponding service based on the consortium blockchain, and the headquarters, branches, agents serving as consortium members each can serve as one service node of the service. Each service node can publish an execution result generated or received by the service node in the consortium blockchain in a form of a transaction, and store the transaction in a distributed database of the consortium blockchain after consensus processing is performed on the transaction by the consensus nodes in the consortium blockchain, to complete a "on-chain" storage of the transaction information.

It is worthwhile to note that the transaction described in the present specification is a piece of data that is created by a client device of a blockchain and that needs to be finally published to a distributed database of the blockchain.

Transactions in blockchains are usually classified into narrow transactions and broad transactions. The narrow transaction is a value transfer published by a user to a blockchain. For example, in a conventional bitcoin blockchain network, a transaction can be a transfer initiated by a user in a blockchain. The broad transaction is a piece of service data with a service intention that is published by a user to a blockchain. For example, an operator can set up a consortium blockchain based on an actual service demand, and deploy some other types of online services (for example, broad services can be classified into query services, invoking services, etc.) unrelated to value transfer in the consortium blockchain. In this type of consortium blockchain, a transaction can be a service message or a service request with a service intention that is published by a user in the consortium blockchain.

The client device can include any type of upper-layer application that implements a specific service function by using underlying service data stored in a blockchain as data support.

Figure 1:
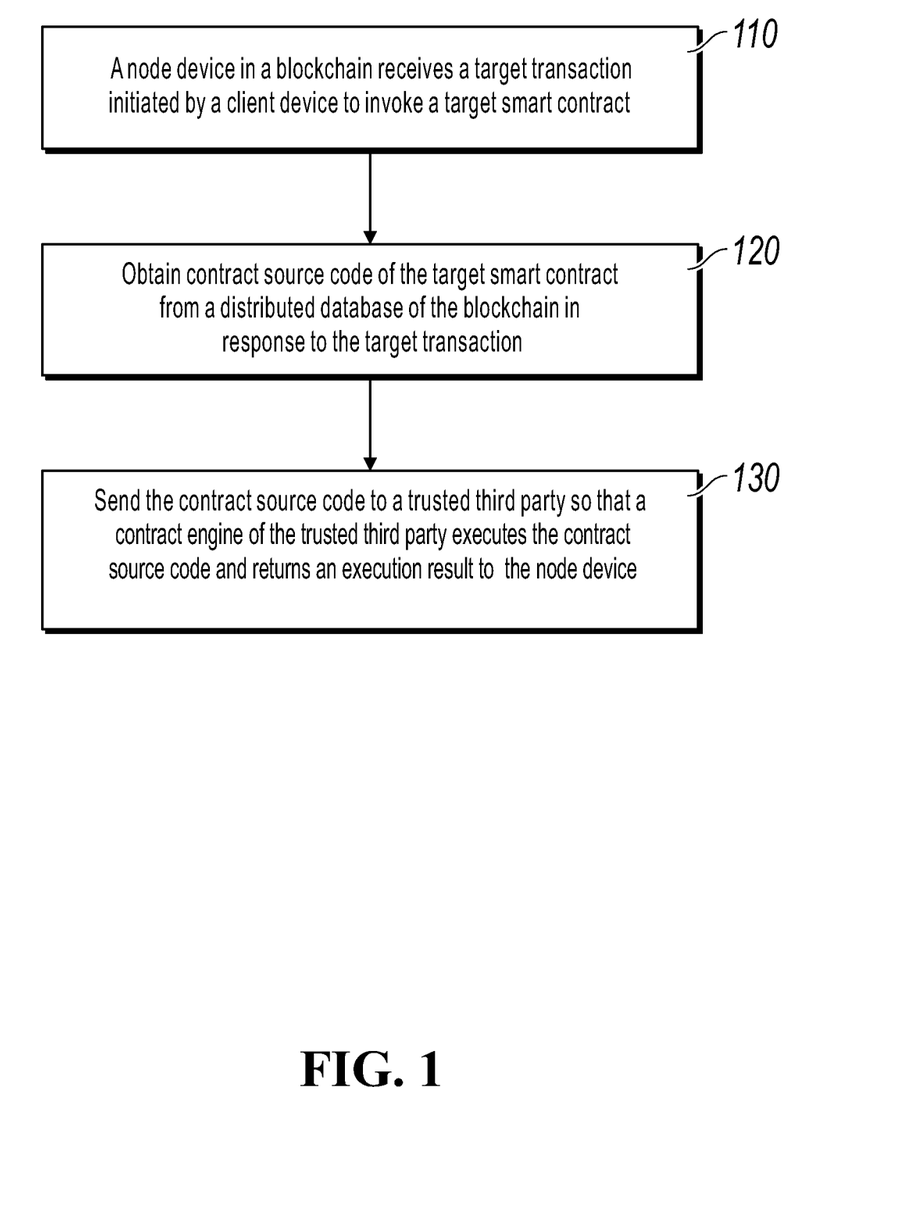
FIG. 1 is a flowchart illustrating a method for executing a smart contract of a blockchain according to an embodiment of the present specification.

FIG. 1 is a flowchart illustrating a method for executing a smart contract of a blockchain according to an embodiment of the present specification. The blockchain is interconnected to a trusted third party, a contract engine for executing a smart contract is deployed in the trusted third party, and the method can include the following steps:

Step 110: A node device in the blockchain receives a target transaction initiated by a client device to invoke a target smart contract.

Step 120: Obtain contract source code of the target smart contract from a distributed database of the blockchain in response to the target transaction.

Step 130: Send the contract source code to the trusted third party so that the contract engine of the trusted third party executes the contract source code and returns an execution result to the node device.

Figure 2:
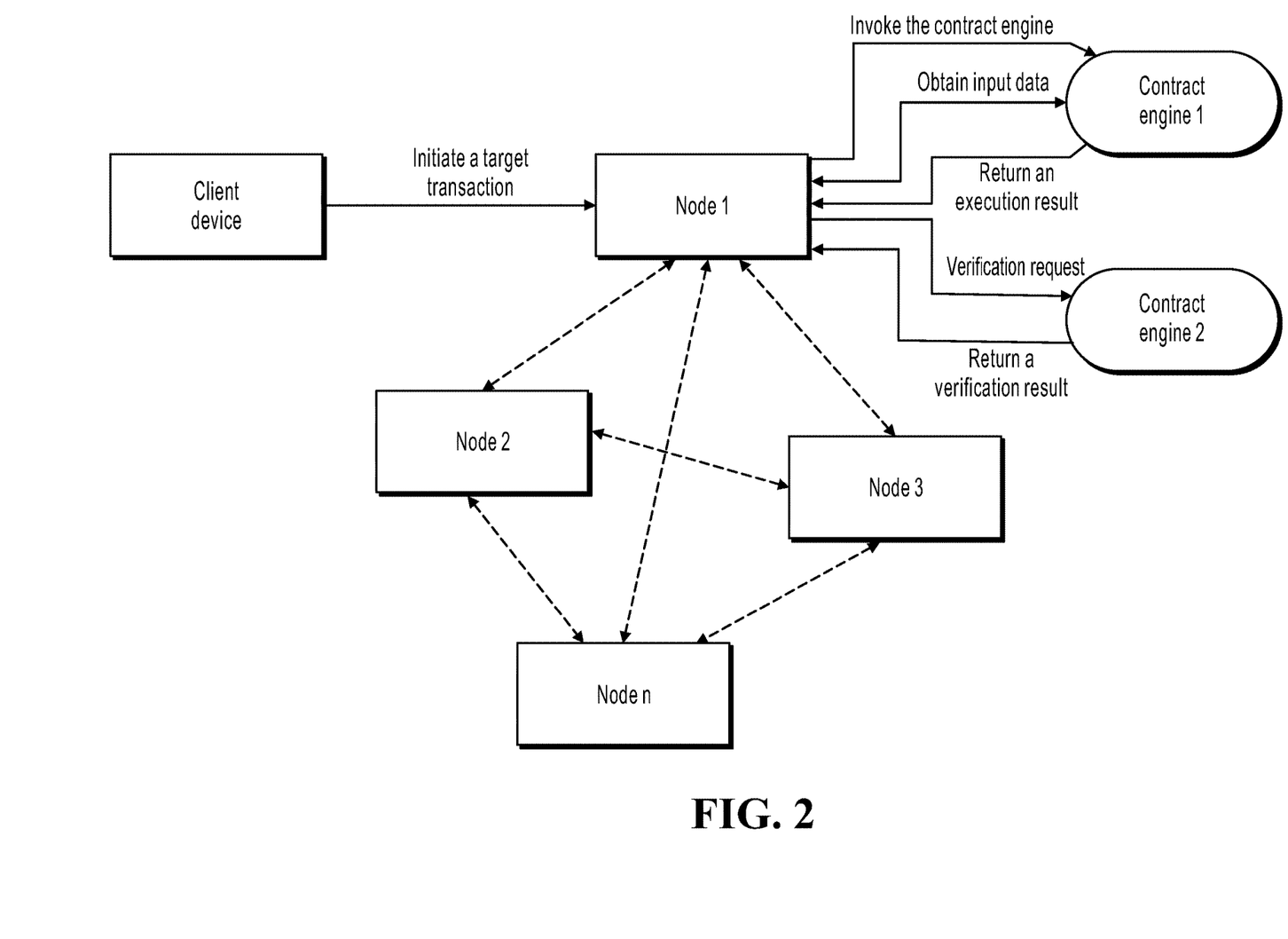
FIG. 2 is a schematic architectural diagram illustrating a blockchain system according to an embodiment of the present specification.

The following provides description by using a blockchain system shown in FIG. 2 as an example.

The client device initiates a target transaction to the blockchain, a smart contract function is invoked by using an SDK, and the SDK sends the target transaction to a node device in the blockchain. The node device can be referred to as an invoking node. The target transaction can carry a related execution parameter, for example, can include a contract name, an invoked function name, an input parameter, a transaction ID, a timestamp, etc.

As described above, the node device in the present specification is not responsible for running a smart contract. Therefore, after receiving the target transaction initiated by the client device, the invoking node needs to invoke the contract engine of the trusted third party to execute service logic of a corresponding smart contract.

The invoking node first needs to obtain contract source code used by the contract engine to execute the corresponding smart contract.

In an embodiment, the target transaction includes a target smart contract name and a name of a target function invoked in the target smart contract; and the obtaining contract source code of the target smart contract from a distributed database of the blockchain specifically includes:

obtaining contract source code corresponding to the target smart contract name from the distributed database of the blockchain based on the target smart contract name included in the target transaction; and obtaining contract source code corresponding to the name of the target function from the obtained contract source code based on the name of the target function invoked in the target smart contract.

That is, the node device can obtain the contract source code required by the target smart contract from the distributed database of the blockchain based on the target smart contract name and the name of the invoked target function.

The contract source code includes multiple functions. Each function has a certain logic function and can be used to execute corresponding logic in a contract engine. A corresponding function can be determined based on the name of the invoked target function, to ensure that the function included in the contract source code is consistent with the invoked target function.

In this embodiment, to prevent the contract engine of the trusted third party from doing evil, the contract source code of the smart contract is stored in the distributed database of the blockchain. When the smart contract needs to be used, the invoking node first obtains the corresponding contract source code from the distributed database, and then sends the contract source code to the contract engine of the trusted third party. As such, each smart contract executed by the contract engine is provided temporarily by an invoking node.

In an embodiment, the target transaction further includes an input parameter; and sending the contract source code to the trusted third party so that the contract engine of the trusted third party executes the contract source code includes: sending the contract source code and the input parameter to the trusted third party, so that the trusted third party obtains input data corresponding to the input parameter from the node device, loads the input data into the contract source code, and executes the contract source code.

In practice, some service types may not require data transmission. In this case, the node device does not need to transmit an input parameter (or the input parameter can be empty), and the contract engine does not need to obtain input data from the node device.

For some complex services, input data is required. In this case, a user needs to submit an input parameter when initiating a transaction.

As shown in FIG. 2, when invoking the contract engine, the node device needs to provide the contract source code and the input parameter. In this case, the contract engine can obtain the input data from the node device based on the input parameter. The input parameter can be provided by the client device (e.g., the user), and the input data can be other data required for executing the smart contract.

The following uses an example to describe a difference between the input parameter and the input data.

Assuming that the transaction request sent by the client device is let a+1, the field a and +1 are input parameters, and a current value of a is input data. When a+1 is actually operated, an original value (input data) of a needs to be obtained first, and then 1 is added to the original value to obtain an execution result.

Because the blockchain features in tamper-resistance and the node device stores a full ledger (that is, data), the contract engine can obtain input data that is related to the input parameter and locally stored in the node device from the node device.

The contract source code can be input to the contract engine, so that the contract engine can load the input data into the contract source code after obtaining the input data, and execute the contract source code to obtain the execution result.

It is worthwhile to note that the contract engine further generates a read-write set in a process of executing the contract source code. The read-write set can include the input data required when the contract source code is executed and output data corresponding to the input data. For complex contract source code, multiple sets of input data and output data can be included. That is, the read-write set is a data set including all input data required in the process of executing the contract source code and corresponding output data, and can truly reflect an entire computational process of executing the contract source code. References can be made to the example shown in the following Table 1 or Table 2.

In an embodiment, the execution result is a result set generated by the trusted third party based on an execution result of the contract source code, and the result set includes the read-write set generated in the process of executing the contract source code and an execution result obtained after the contract source code is executed.

The contract engine can package the input parameter, the contract source code (or contract source code hash), the read-write set, and the execution result into the result set, and add a signature of the contract engine to the result set; and return the signed result set to the node device as the execution result.

Correspondingly, the node device receives the result set returned by the contract engine. The result set is a set obtained after the contract engine packages the input parameter, the contract source code (or the contract source code hash), the read-write set, and the execution result and then adds the signature of the contract engine.

In this embodiment, the contract engine needs to add the signature to the result set to ensure execution validity of the smart contract. The node device does not acknowledge a result set without the signature and considers the result set invalid.

It is worthwhile to note that the contract source code hash is a hash value obtained based on the contract source code. The contract source code hash can be used to verify whether the contract source code invoked by the contract engine is tampered with. For example, assuming that the contract source code provided by the node device is A and correct hash is (A) hash, the node device or another node can determine whether the contract engine has tampered with the contract source code only by comparing a contract source code hash value of the target smart contract with a contract source code hash value in the result set. Assuming that the contract engine has tampered with the contract source code without authorization and tampered contract source code is A+1, the returned contract source code hash becomes (A+1) hash, which is clearly inconsistent with (A) hash of the original contract source code.

In an embodiment, the blockchain is interconnected to another trusted third party that serves as a verification party; and the method further includes: sending the execution result to the other trusted third party, so that a contract engine of the other trusted third party verifies the execution result; and in response to determining that the verification on the execution result succeeds, publishing the execution result to all node devices in the blockchain for consensus processing, and storing the execution result in the blockchain after the consensus succeeds.

For ease of distinguishing, in the following, the contract engine of the other trusted third party is referred to as a second contract engine, and the previously described contract engine for running a smart contract is referred to as a first contract engine.

As shown in FIG. 2, the node device can verify the execution result of the first contract engine by using the second contract engine.

In an embodiment, a verification process for the execution result includes the following: the second contract engine reads input data from the read-write set, loads the read input data into the contract source code, and simulates execution of the contract source code; determines whether an execution result generated by simulating execution of the contract source code is consistent with the execution result in the result set; and in response to determining that the execution result generated by simulating execution of the contract source code is consistent with the execution result in the result set, determines that the verification on the execution result succeeds.

A signature of the second contract engine can be further added to the result set of the first contract engine.

In an embodiment, a verification process for the execution result includes the following: the contract engine of the other trusted third party reads input data from the read-write set, loads the read input data into the contract source code, and simulates execution of the contract source code; determines whether a read-write set generated by simulating execution of the contract source code is consistent with the read-write set in the result set; and in response to determining that the read-write set generated by simulating execution of the contract source code is consistent with the read-write set in the result set, determines that the verification on the execution result succeeds.

A signature of the second contract engine can be further added to the result set of the first contract engine.

For example, for a+2 and a+2, a read-write set is correspondingly shown in the following Table 1:

| Read  | Write |
|-------|-------|
| a = 0 | a = 2 |
| a = 2 | a = 4 |

Table 1 means first calculating a+2: generating the first read data a=0, and generating the first write data a=2 after running a+1; and then calculating a+2: generating the second read data a=2, and generating the second write data a=4 after running a+2.

If the first contract engine has maliciously tampered with the computational process to change a+2 and a+2 to a+1 and a+3, a read-write set is shown in the following Table 2:

| Read  | Write |
|-------|-------|
| a = 0 | a = 1 |
| a = 1 | a = 4 |

Assuming that Table 2 is the read-write set in the result set returned by the first contract engine and Table 1 is the read-write set obtained after the second contract engine simulates running of the contract source code, it can be determined, by comparing Table 1 and Table 2, that Table 1 is faulty, which indicates that the first contract engine has tampered with the contract source code.

However, if only the execution results are compared, erroneous determining is likely to be caused because the execution results in Table 1 and Table 2 are both 4.

The second contract engine is used to determine whether the read-write set returned by the first contract engine is authentic and valid. As described above, the read-write set includes a series of inputs and outputs. After the input data is read from the read-write set and the output data is obtained through simulated execution, it is acknowledged one by one whether the obtained output data is consistent with the output data in the read-write set (that is, whether an operation result of each step of the entire process satisfies an expectation). If all the obtained output data is consistent with the output data in the read-write set, it is proved that the read-write set is valid and has not been tampered with. In this case, a final execution result is further matched with the result in the result set. This verification process can prevent the first contract engine from cheating.

The following describes an inter-node device consensus mechanism in the present specification:

As described above, in response to determining that the verification on the execution result succeeds, the node device needs to publish the execution result to all the node devices in the blockchain for consensus processing, and stores the execution result in the blockchain after the consensus succeeds.

The consensus process here can be as follows:

The node device first stores the execution result in a local state database (to update a world stare of the node device). When performing consensus on the execution result of the smart contract, the node device can compare received execution results sent by the other node devices with the execution result in the local state database, to perform consensus on the execution result.

The consensus succeeds in response to determining that the execution results returned by all the node devices or execution results returned by most node devices are consistent with the execution result in the world state of the node device.

In an optional embodiment, the read-write set can be further stored in addition to the execution result.

The node device first stores the returned read-write set in the local state database (to update the world state of the node device). When performing consensus on the execution result of the smart contract, the node device can compare received read-write sets sent by the other node devices with the read-write set in the local state database, to perform consensus on the execution result.

The consensus succeeds in response to determining that the read-write sets returned by all the node devices or read-write sets returned by most node devices are consistent with the read-write set in the world state of the node device.

In this embodiment, when consensus is performed among the node devices in the blockchain, instead of performing consensus verification on the execution result of the smart contract by executing the smart contract again, the consensus on the execution result of the smart contract can be completed by directly comparing the result set with the world state. Therefore, consensus efficiency can be greatly improved.

Figure 3:
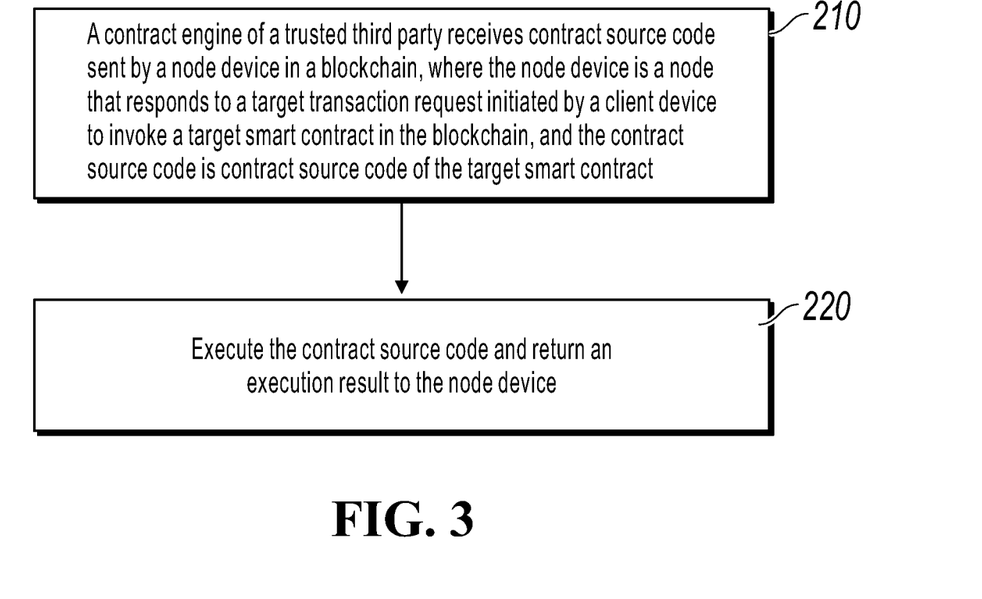
FIG. 3 is a flowchart illustrating a method for executing a smart contract of a blockchain according to an embodiment of the present specification.

FIG. 3 is a flowchart illustrating a method for executing a smart contract of a blockchain according to an embodiment of the present specification. The blockchain is interconnected to a trusted third party, a contract engine for executing a smart contract is deployed in the trusted third party, and the method can be applied to the contract engine and the method can include the following steps:

Step 210: The contract engine of the trusted third party receives contract source code sent by a node device in the blockchain, where the node device is a node that responds to a target transaction request initiated by a client device to invoke a target smart contract in the blockchain, and the contract source code is contract source code of the target smart contract.

Step 220: Execute the contract source code and return an execution result to the node device.

This embodiment is described by using the contract engine as an execution body. For the related node device, references can be made to the previously described embodiment shown in FIG. 1. Details are omitted in this embodiment for simplicity.

In an embodiment, the transaction includes an input parameter; the receiving contract source code sent by a node device in the blockchain specifically includes: receiving the contract source code and the input parameter that are sent by the node device in the blockchain; and the executing the contract source code specifically includes: obtaining input data corresponding to the input parameter from the node device, loading the input data into the contract source code, and executing the contract source code.

In an embodiment, the method further includes: when receiving a verification request sent by the node device for a result set of a contract engine of another trusted third party, verifying the result set, where the result set includes a read-write set generated in a process of executing the contract source code and an execution result obtained after the contract source code is executed; and in response to determining that the verification on the result set succeeds, publishing the execution result in the result set to all node devices in the blockchain for consensus processing, and storing the execution result in the result set in the blockchain after the consensus succeeds.

In an embodiment, a verification process for the second execution result includes:

reading input data from the read-write set, loading the read input data into the contract source code, and simulating execution of the contract source code; determining whether an execution result generated by simulating execution of the contract source code is consistent with the execution result in the result set; and in response to determining that the execution result generated by simulating execution of the contract source code is consistent with the execution result in the result set, determining that the verification on the execution result succeeds.

In an embodiment, a verification process for the second execution result includes: reading input data from the read-write set, loading the read input data into the contract source code, and simulating execution of the contract source code; determining whether a read-write set generated by simulating execution of the contract source code is consistent with the read-write set in the result set; and in response to determining that the read-write set generated by simulating execution of the contract source code is consistent with the read-write set in the result set, determining that the verification on the execution result succeeds.

In summary, the embodiments provide solutions for executing a smart contract of a blockchain, to decouple the smart contract from a node in the blockchain. The node device in the blockchain no longer stores the smart contract and is not responsible for running the smart contract. Instead, a contract engine deployed in a trusted third party interconnected to the blockchain is responsible for running the smart contract. As such, when a node device that responds to a transaction initiated by a client device in the blockchain needs to execute related service logic, the node device can invoke the contract engine of the trusted third party, so that the contract engine runs a related smart contract to obtain an execution result. The smart contract is unbound from the node device to separate the smart contract from the node device, to be run by the contract engine, which simplifies a function of the node device, thereby reducing a demand for performance of the node device (for example, a device with low performance can also be used as a node device to access the blockchain). In addition, when consensus is performed among node devices in the blockchain, the consensus can be implemented only by comparing a result set with a world state instead of depending on a smart contract, so that not every device needs to participate in smart contract execution, thereby greatly improving consensus efficiency. Furthermore, as a node dedicated to running a smart contract, the trusted third party interconnected to the blockchain can be provided with powerful storage and computational capacities in advance to deploy a large quantity of smart contracts, and service logic of the smart contract can be designed to be relatively complex to cope with a service need with a relatively large computational load and relatively high service complexity.

Figure 4:
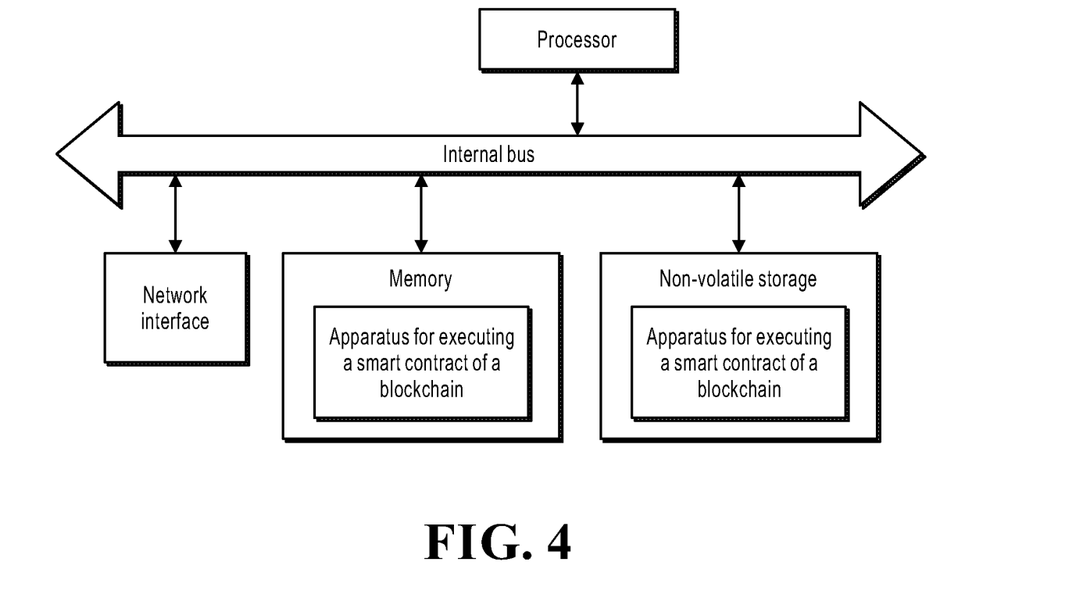
FIG. 4 is a structural diagram illustrating hardware of an apparatus for executing a smart contract of a blockchain according to an embodiment of the present specification.

Corresponding to the previously described embodiments of the methods for executing a smart contract of a blockchain, the present specification further provides embodiments of apparatuses for executing a smart contract of a blockchain. The apparatus embodiments can be implemented by using software, or can be implemented by using hardware or a combination of software and hardware. Software implementation is used as an example. As a logical apparatus, the apparatus is implemented by reading a corresponding computer service program instruction from a non-volatile storage to a memory for running by using a processor of a device that the apparatus is located in. In terms of a hardware level, FIG. 4 is a structural diagram illustrating hardware of a device that an apparatus for executing a smart contract of a blockchain is located in according to the present specification. In addition to a processor, a network interface, a memory, and a non-volatile storage shown in FIG. 4, in this embodiment, the device that the apparatus is located in usually can further include other hardware based on an actual execution function of the smart contract of the blockchain. Details are omitted here for simplicity.

Figure 5:
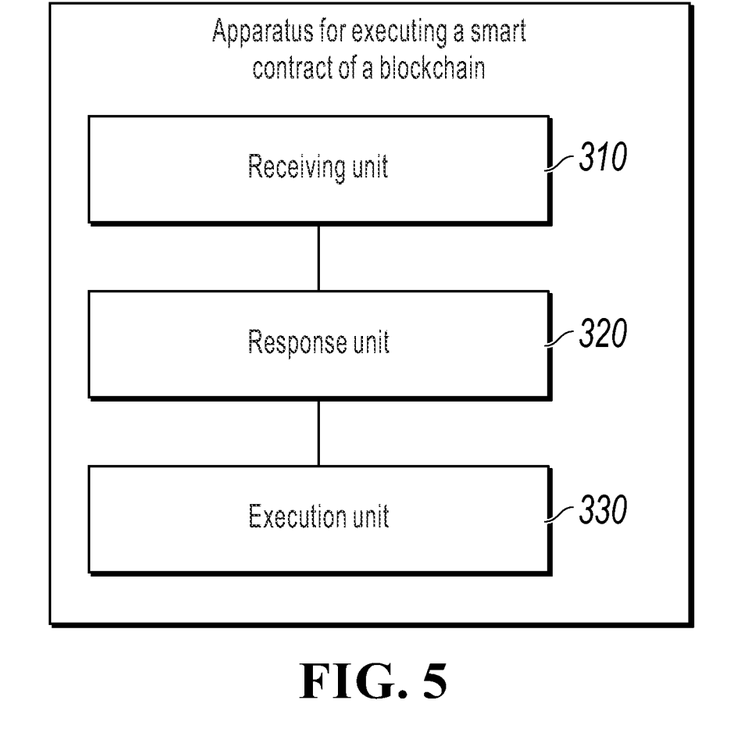
FIG. 5 is a schematic diagram illustrating modules of an apparatus for executing a smart contract of a blockchain according to an embodiment of the present specification.

FIG. 5 is a diagram illustrating modules of an apparatus for executing a smart contract of a blockchain according to an embodiment of the present specification. The apparatus corresponds to the embodiment shown in FIG. 1. The blockchain is interconnected to a trusted third party, a contract engine for executing a smart contract is deployed in the trusted third party, and the apparatus includes: a receiving unit 310, configured to receive a target transaction initiated by a client device to invoke a target smart contract; a response unit 320, configured to obtain contract source code of the target smart contract from a distributed database of the blockchain in response to the target transaction; and an execution unit 330, configured to send the contract source code to the trusted third party so that the contract engine of the trusted third party executes the contract source code and returns an execution result to the node device.

Optionally, the target transaction includes a target smart contract name and a name of a target function invoked in the target smart contract; and the response unit 320 is specifically configured to: in response to the target transaction, obtain contract source code corresponding to the target smart contract name from the distributed database of the blockchain based on the target smart contract name included in the target transaction; and obtain contract source code corresponding to the name of the target function from the obtained contract source code based on the name of the target function invoked in the target smart contract.

Optionally, the transaction includes an input parameter; and the execution unit 330 is configured to: send the contract source code and the input parameter to the trusted third party, so that the trusted third party obtains input data corresponding to the input parameter from the node device, loads the input data into the contract source code, executes the contract source code, and returns the execution result to the node device.

Optionally, the blockchain is interconnected to another trusted third party that serves as a verification party; and the apparatus further includes: a verification unit, configured to send the execution result to the other trusted third party, so that a contract engine of the other trusted third party verifies the execution result; and in response to determining that the verification on the execution result succeeds, publish the execution result to all node devices in the blockchain for consensus processing, and store the execution result in the blockchain after the consensus succeeds.

Optionally, the execution result is a result set generated by the trusted third party based on an execution result of the contract source code, and the result set includes a read-write set generated in a process of executing the contract source code and an execution result obtained after the contract source code is executed; and a verification process for the execution result includes the following: the contract engine of the other trusted third party reads input data from the read-write set, loads the read input data into the contract source code, and simulates execution of the contract source code; determines whether an execution result generated by simulating execution of the contract source code is consistent with the execution result in the result set; and in response to determining that the execution result generated by simulating execution of the contract source code is consistent with the execution result in the result set, determines that the verification on the execution result succeeds.

Optionally, the execution result is a result set generated by the trusted third party based on an execution result of the contract source code, and the result set includes a read-write set generated in a process of executing the contract source code and an execution result obtained after the contract source code is executed; and a verification process for the execution result includes the following: the contract engine of the other trusted third party reads input data from the read-write set, loads the read input data into the contract source code, and simulates execution of the contract source code; determines whether a read-write set generated by simulating execution of the contract source code is consistent with the read-write set in the result set; and in response to determining that the read-write set generated by simulating execution of the contract source code is consistent with the read-write set in the result set, determines that the verification on the execution result succeeds.

Optionally, the blockchain is a consortium blockchain.

Figure 6:
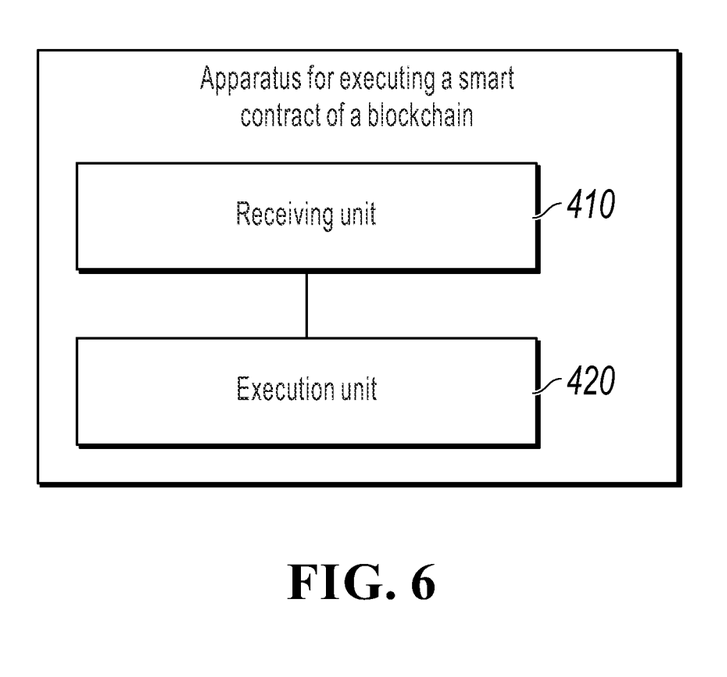
FIG. 6 is a schematic diagram illustrating modules of an apparatus for executing a smart contract of a blockchain according to an embodiment of the present specification.

FIG. 6 is a diagram illustrating modules of an apparatus for executing a smart contract of a blockchain according to an embodiment of the present specification. The apparatus corresponds to the embodiment shown in FIG. 3. The blockchain is interconnected to a trusted third party, a contract engine for executing a smart contract is deployed in the trusted third party, and the apparatus includes: a receiving unit 410, configured to receive contract source code sent by a node device in the blockchain, where the node device is a node that responds to a target transaction request initiated by a client device to invoke a target smart contract in the blockchain, and the contract source code is contract source code of the target smart contract; and an execution unit 420, configured to execute the contract source code and return an execution result to the node device.

Optionally, the transaction includes an input parameter; the receiving unit 410 receives the contract source code sent by the node device in the blockchain, specifically including: receiving the contract source code and the input parameter that are sent by the node device in the blockchain; and the execution unit 420 executes the contract source code, specifically including: obtaining input data corresponding to the input parameter from the node device, loading the input data into the contract source code, and executing the contract source code.

Optionally, the apparatus further includes: a verification unit, configured to: when receiving a verification request sent by the node device for a result set of a contract engine of another trusted third party, verify the result set, where the result set includes a read-write set generated in a process of executing the contract source code and an execution result obtained after the contract source code is executed; and a consensus unit, configured to: in response to determining that the verification on the result set succeeds, publish the execution result in the result set to all node devices in the blockchain for consensus processing, and store the execution result in the result set in the blockchain after the consensus succeeds.

Optionally, a verification process for the second execution result includes: reading input data from the read-write set, loading the read input data into the contract source code, and simulating execution of the contract source code; determining whether an execution result generated by simulating execution of the contract source code is consistent with the execution result in the result set; and in response to determining that the execution result generated by simulating execution of the contract source code is consistent with the execution result in the result set, determining that the verification on the execution result succeeds.

Optionally, a verification process for the second execution result includes: reading input data from the read-write set, loading the read input data into the contract source code, and simulating execution of the contract source code; determining whether a read-write set generated by simulating execution of the contract source code is consistent with the read-write set in the result set; and in response to determining that the read-write set generated by simulating execution of the contract source code is consistent with the read-write set in the result set, determining that the verification on the execution result succeeds.

Optionally, the blockchain is a consortium blockchain.

The systems, apparatuses, or modules, or units described in the previously described embodiments can be specifically implemented by computer chips or entities, or can be implemented by products with certain functions. A typical implementation device is a computer, and a specific form of the computer can be a personal computer, a laptop computer, a cellular phone, a camera phone, a smartphone, a personal digital assistant, a media player, a navigation device, an e-mail sending/receiving device, a game console, a tablet computer, a wearable device, or any combination of several of these devices.

For a specific implementation process of a function of each unit in the apparatus, references can be made to an implementation process of a corresponding step in the previously described method. Details are omitted here for simplicity.

Because an apparatus embodiment basically corresponds to a method embodiment, for related parts, references can be made to some descriptions in the method embodiment. The previously described apparatus embodiments are merely examples. The units described as separate parts may or may not be physically separate, and parts displayed as units may or may not be physical units, that is, can be located in one position, or can be distributed on a plurality of network units. Some or all of the modules can be selected based on actual demands to achieve the objectives of the solutions of the present specification. A person of ordinary skill in the art can understand and implement the embodiments of the present specification without creative efforts.

FIG. 5 schematically describes the internal functional modules and the structure of the apparatus for executing a smart contract of a blockchain. Actually, an execution body can be an electronic device, including: a processor; and a memory configured to store processor-executable instructions, where the processor is configured to: receive a target transaction initiated by a client device to invoke a target smart contract, where the blockchain is interconnected to a trusted third party, and a contract engine for executing a smart contract is deployed in the trusted third party; obtain contract source code of the target smart contract from a distributed database of the blockchain in response to the target transaction; and send the contract source code to the trusted third party so that the contract engine of the trusted third party executes the contract source code and returns an execution result to the node device.

FIG. 6 schematically describes the internal functional modules and the structure of the blockchain-based logistics price insuring apparatus. Actually, an execution body can be an electronic device, including: a processor; and a memory configured to store processor-executable instructions, where the processor is configured to: receive contract source code sent by a node device in the blockchain, where the node device is a node that responds to a target transaction request initiated by a client device to invoke a target smart contract in the blockchain, the contract source code is contract source code of the target smart contract, the blockchain is interconnected to a trusted third party, and a contract engine for executing a smart contract is deployed in the trusted third party; and execute the contract source code and return an execution result to the node device.

It is worthwhile to understand that in the previously described embodiments of the electronic devices, the processor can be a central processing unit (English: Central Processing Unit, CPU for short), or can be another general-purpose processor, a digital signal processor (English: Digital Signal Processor, DSP for short), an application specific integrated circuit (English: Application Specific Integrated Circuit, ASIC for short), etc. The general-purpose processor can be a microprocessor, or the processor can be any normal processor, etc. The previously described memory can be a read-only memory (English: read-only memory, ROM for short), a random access memory (English: random access memory, RAM for short), a flash memory, a hard disk, or a solid-state drive. The steps of the methods disclosed with reference to the embodiments of the present invention can be directly performed by using a hardware processor, or can be performed by using a combination of hardware in the processor and a software module.

The embodiments in the present specification are all described in a progressive way, for same or similar parts in the embodiments, mutual references can be made to the embodiments, and each embodiment focuses on a difference from the other embodiments. Especially, an electronic device embodiment is basically similar to a method embodiment and therefore is described briefly, and for related parts, references can be made to some descriptions in the method embodiment.

A person skilled in the art can easily figure out other implementation solutions of the present specification after considering the present specification and practicing the invention disclosed here. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The present specification and the embodiments are merely considered as examples, and the actual scope and spirit of the present specification are pointed out by the following claims.

It is worthwhile to understand that the present specification is not limited to the previously described accurate structures shown in the accompanying drawings, and various modifications and changes can be made without departing from the scope of the present specification. The scope of the present specification is limited only by the appended claims.

What is claimed is:

1. A computer-implemented method for blockchain-based smart contract execution, comprising:
    receiving, by a node device in a blockchain, a target transaction initiated by a client device to invoke a target smart contract, wherein the blockchain is interconnected to a trusted third party, and wherein a contract engine for smart contract execution is deployed in the trusted third party;
    in response to receiving the target transaction, obtaining, by the node device and from a distributed database of the blockchain, contract source code of the target smart contract;
    sending, by the node device, the contract source code to the trusted third party; and
    receiving, by the node device and from the trusted third party, an execution result from execution of the contract source code by the contract engine.

2. The computer-implemented method of claim 1, wherein the target transaction comprises a target smart contract name and a name of a target function invoked in the target smart contract, and wherein obtaining the contract source code of the target smart contract from the distributed database of the blockchain comprises:
    obtaining, by the node device and from the distributed database of the blockchain, first contract source code corresponding to the target smart contract name comprised in the target transaction; and
    obtaining, by the node device and from the first contract source code corresponding to the target smart contract name, second contract source code corresponding to the name of the target function invoked in the target smart contract.

3. The computer-implemented method of claim 1, wherein the target transaction further comprises a plurality of input parameters, and wherein sending the contract source code to the trusted third party comprises:
    sending, by the node device, the contract source code and the plurality of input parameters to the trusted third party, wherein the trusted third party obtains input data corresponding to the plurality of input parameters from the node device, loads the input data into the contract source code, and executes the contract source code.

4. The computer-implemented method of claim 3, wherein the blockchain is interconnected to a second trusted third party that serves as a verification party, and wherein the computer-implemented method further comprises:
    sending, by the node device, the execution result to the second trusted third party, wherein a second contract engine of the second trusted third party verifies the execution result;
    determining, by the node device, that verification on the execution result by the second contract engine of the second trusted third party succeeds;
    in response to determining that the verification on the execution result succeeds, publishing, by the node device, the execution result to all node devices in the blockchain for consensus processing;
    determining, by the node device, that the consensus processing succeeds; and
    in response to determining that the consensus processing succeeds, storing, by the node device, the execution result in the blockchain.

5. The computer-implemented method of claim 4, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:
    determining, by the node device, that a second result generated by simulated execution of the contract source code from the second contract engine of the second trusted third party is consistent with the first result in the first result set, wherein the second contract engine of the second trusted third party generates the second result by reading input data from the first read-write set in the first result set, loading the input data from the first read-write set in the first result set into the contract source code, and simulating execution of the contract source code; and
    in response to determining that the second result generated by the simulated execution of the contract source code from the second contract engine of the second trusted third party is consistent with the first result in the first result set, determining, by the node device, that the verification on the execution result by the second contract engine of the second trusted third party succeeds.

6. The computer-implemented method of claim 4, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:
    determining, by the node device, that a second read-write set generated by simulated execution of the contract source code from the second contract engine of the second trusted third party is consistent with the first read-write set in the first result set, wherein the second contract engine of the second trusted third party generates the second read-write set by reading input data from the first read-write set in the first result set, loading the input data from the first read-write set in the first result set into the contract source code, and simulating execution of the contract source code; and
    in response to determining that the second read-write set generated by the simulated execution of the contract source code from the second contract engine of the second trusted third party is consistent with the first read-write set in the first result set, determining, by the node device, that the verification on the execution result by the second contract engine of the second trusted third party succeeds.

7. The computer-implemented method of claim 1, wherein the blockchain is a consortium blockchain.

8. A non-transitory, computer-readable medium storing one or more instructions executable by a computer system to perform operations for blockchain-based smart contract execution, wherein the operations comprise:
- receiving, by a node device in a blockchain, a target transaction initiated by a client device to invoke a target smart contract, wherein the blockchain is interconnected to a trusted third party, and wherein a contract engine for smart contract execution is deployed in the trusted third party;
- in response to receiving the target transaction, obtaining, by the node device and from a distributed database of the blockchain, contract source code of the target smart contract;
- sending, by the node device, the contract source code to the trusted third party; and
- receiving, by the node device and from the trusted third party, an execution result from execution of the contract source code by the contract engine.

9. The non-transitory, computer-readable medium of claim 8, wherein the target transaction comprises a target smart contract name and a name of a target function invoked in the target smart contract, and wherein obtaining the contract source code of the target smart contract from the distributed database of the blockchain comprises:
- obtaining, by the node device and from the distributed database of the blockchain, first contract source code corresponding to the target smart contract name comprised in the target transaction; and
- obtaining, by the node device and from the first contract source code corresponding to the target smart contract name, second contract source code corresponding to the name of the target function invoked in the target smart contract.

10. The non-transitory, computer-readable medium of claim 8, wherein the target transaction further comprises a plurality of input parameters, and wherein sending the contract source code to the trusted third party comprises:
- sending, by the node device, the contract source code and the plurality of input parameters to the trusted third party, wherein the trusted third party obtains input data corresponding to the plurality of input parameters from the node device, loads the input data into the contract source code, and executes the contract source code.

11. The non-transitory, computer-readable medium of claim 10, wherein the blockchain is interconnected to a second trusted third party that serves as a verification party, and wherein the operations further comprise:
- sending, by the node device, the execution result to the second trusted third party, wherein a second contract engine of the second trusted third party verifies the execution result;
- determining, by the node device, that verification on the execution result by the second contract engine of the second trusted third party succeeds;
- in response to determining that the verification on the execution result succeeds, publishing, by the node device, the execution result to all node devices in the blockchain for consensus processing;
- determining, by the node device, that the consensus processing succeeds; and
- in response to determining that the consensus processing succeeds, storing, by the node device, the execution result in the blockchain.

12. The non-transitory, computer-readable medium of claim 11, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:
- determining, by the node device, that a second result generated by simulated execution of the contract source code from the second contract engine of the second trusted third party is consistent with the first result in the first result set, wherein the second contract engine of the second trusted third party generates the second result by reading input data from the first read-write set in the first result set, loading the input data from the first read-write set in the first result set into the contract source code, and simulating execution of the contract source code; and
- in response to determining that the second result generated by the simulated execution of the contract source code from the second contract engine of the second trusted third party is consistent with the first result in the first result set, determining, by the node device, that the verification on the execution result by the second contract engine of the second trusted third party succeeds.

13. The non-transitory, computer-readable medium of claim 11, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:
- determining, by the node device, that a second read-write set generated by simulated execution of the contract source code from the second contract engine of the second trusted third party is consistent with the first read-write set in the first result set, wherein the second contract engine of the second trusted third party generates the second read-write set by reading input data from the first read-write set in the first result set, loading the input data from the first read-write set in the first result set into the contract source code, and simulating execution of the contract source code; and
- in response to determining that the second read-write set generated by the simulated execution of the contract source code from the second contract engine of the second trusted third party is consistent with the first read-write set in the first result set, determining, by the node device, that the verification on the execution result by the second contract engine of the second trusted third party succeeds.

14. The non-transitory, computer-readable medium of claim 8, wherein the blockchain is a consortium blockchain.

15. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations for blockchain-based smart contract execution, wherein the one or more operations comprise:
  - receiving, by a node device in a blockchain, a target transaction initiated by a client device to invoke a target smart contract, wherein the blockchain is interconnected to a trusted third party, and wherein a contract engine for smart contract execution is deployed in the trusted third party;

in response to receiving the target transaction, obtaining, by the node device and from a distributed database of the blockchain, contract source code of the target smart contract;

sending, by the node device, the contract source code to the trusted third party; and receiving, by the node device and from the trusted third party, an execution result from execution of the contract source code by the contract engine.

16. The computer-implemented system of claim 15, wherein the target transaction comprises a target smart contract name and a name of a target function invoked in the target smart contract, and wherein obtaining the contract source code of the target smart contract from the distributed database of the blockchain comprises:

obtaining, by the node device and from the distributed database of the blockchain, first contract source code corresponding to the target smart contract name comprised in the target transaction; and obtaining, by the node device and from the first contract source code corresponding to the target smart contract name, second contract source code corresponding to the name of the target function invoked in the target smart contract.

17. The computer-implemented system of claim 15, wherein the target transaction further comprises a plurality of input parameters, and wherein sending the contract source code to the trusted third party comprises:

sending, by the node device, the contract source code and the plurality of input parameters to the trusted third party, wherein the trusted third party obtains input data corresponding to the plurality of input parameters from the node device, loads the input data into the contract source code, and executes the contract source code.

18. The computer-implemented system of claim 17, wherein the blockchain is interconnected to a second trusted third party that serves as a verification party, and wherein the one or more operations further comprise:

sending, by the node device, the execution result to the second trusted third party, wherein a second contract engine of the second trusted third party verifies the execution result;

determining, by the node device, that verification on the execution result by the second contract engine of the second trusted third party succeeds;

in response to determining that the verification on the execution result succeeds, publishing, by the node device, the execution result to all node devices in the blockchain for consensus processing;

determining, by the node device, that the consensus processing succeeds; and in response to determining that the consensus processing succeeds, storing, by the node device, the execution result in the blockchain.

19. The computer-implemented system of claim 18, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:

determining, by the node device, that a second result generated by simulated execution of the contract source code from the second contract engine of the second trusted third party is consistent with the first result in the first result set, wherein the second contract engine of the second trusted third party generates the second result by reading input data from the first read-write set in the first result set, loading the input data from the first read-write set in the first result set into the contract source code, and simulating execution of the contract source code; and in response to determining that the second result generated by the simulated execution of the contract source code from the second contract engine of the second trusted third party is consistent with the first result in the first result set, determining, by the node device, that the verification on the execution result by the second contract engine of the second trusted third party succeeds.

20. The computer-implemented system of claim 18, wherein the execution result comprises a first result set, wherein the first result set comprises a first read-write set generated during a process of executing the contract source code and a first result obtained after the contract source code is executed, and wherein determining that the verification on the execution result by the second contract engine of the second trusted third party succeeds comprises:

determining, by the node device, that a second read-write set generated by simulated execution of the contract source code from the second contract engine of the second trusted third party is consistent with the first read-write set in the first result set, wherein the second contract engine of the second trusted third party generates the second read-write set by reading input data from the first read-write set in the first result set, loading the input data from the first read-write set in the first result set into the contract source code, and simulating execution of the contract source code; and in response to determining that the second read-write set generated by the simulated execution of the contract source code from the second contract engine of the second trusted third party is consistent with the first read-write set in the first result set, determining, by the node device, that the verification on the execution result by the second contract engine of the second trusted third party succeeds.

* * * * *